March 9, 1965  C. E. A. LENNGREN ETAL  3,172,820
NEUTRONIC REACTOR

Filed March 5, 1959  2 Sheets-Sheet 1

INVENTORS.
CARL EINAR A. LENNGREN
BO OSCAR ALDOR JONSSON
BY  HUGO NILSSON
LARS ZETTERGREN
PER ERIK SCHMELING their ATTORNEYS.

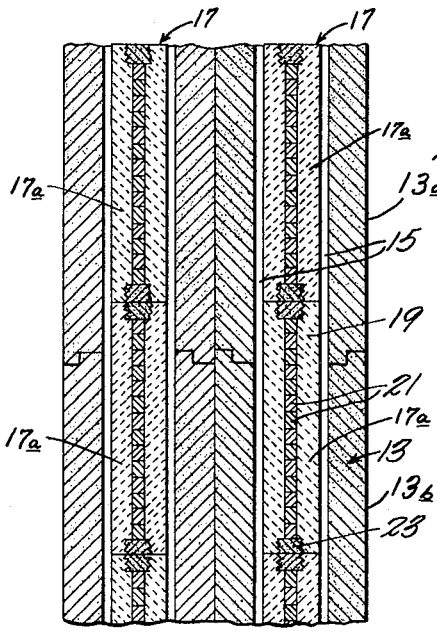
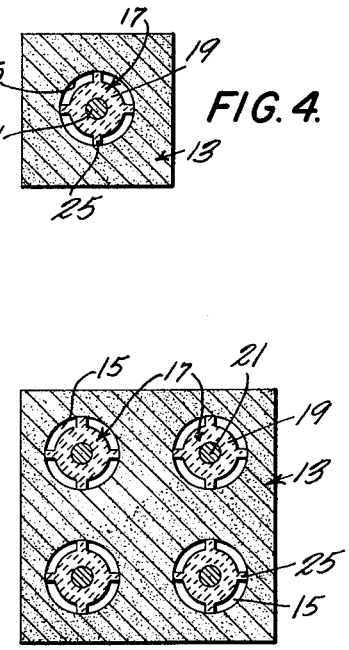
FIG. 2.
FIG. 4.
FIG. 5.
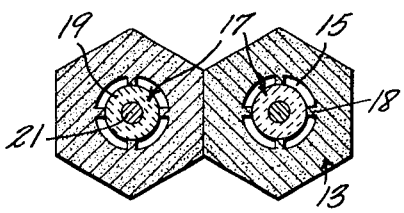
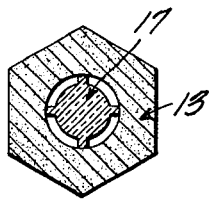
FIG. 3.
FIG. 6.
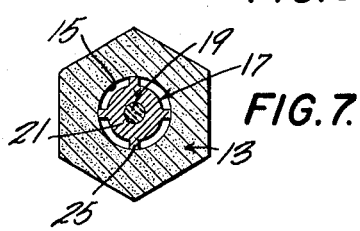
FIG. 7.
INVENTORS.
CARL EINAR A. LENNGREN
BO OSCAR ALDOR JONSSON
HUGO NILSSON
LARS ZETTERGREN
PER ERIK SCHMELING
BY
their ATTORNEYS.

3,172,820
NEUTRONIC REACTOR

Carl Einar A. Lenngren, B. Oscar Aldor Jonsson, Hugo E. Nilsson, Lars G. Zettergren, and Per Erik Schmeling, all of Nynashamn, Sweden, assignors to Rederiaktiebolaget Nordstjernan, Nynashamn, Sweden, a corporation of Sweden
Filed Mar. 5, 1959, Ser. No. 797,384
Claims priority, application Sweden, July 25, 1958, 7,030/58
1 Claim. (Cl. 176—58)

The present invention relates to neutronic reactors and, more particularly, to a new and improved structure for a self-sustaining neutron chain reactor.

In the past it has been the practice to let cooling fluid come into direct contact with the fissionable fuel elements in a solid moderator neutronic reactor. To prevent chemical reactions between the cooling fluid and the fuel and to prevent fission products from entering the cooling fluid, the fuel has been enclosed in a thin metallic container of such material as, for example, an aluminum alloy.

Also, it has been suggested that the fuel, whether or not protected by a metallic container, be positioned in direct contact with the moderator material, and that separate cooling passages be provided in the moderator. Certain advantages are obtained with such an arrangement but not, however, without disadvantages. For example, the distribution of the temperature within the moderator develops unfavorable thermal stresses. In addition, fission products gradually diffuse into and poison the moderator material, particularly if the moderator is graphite.

Accordingly, it is an object of the present invention to provide a structure for a neutronic reactor which overcomes the disadvantages mentioned above.

Another object of the invention is to provide a neutronic reactor of a new and improved structure.

A further object of the invention is to provide a structure for a neutronic reactor which avoids rapid temperature variations of the fuel.

A still further object of the present invention is to provide a new and improved fuel rod structure for use as part of the active fuel section of a neutronic reactor.

Generally, a structure according to the invention provides an arrangement whereby the moderator is divided into two basic parts separated by a cooling means. One part of the moderator quantity provides lateral or transverse support for the reactor core and will be referred to hereinafter as the "moderator block." The other part of the moderator quantity is divided into rods, hereinafter referred to as "moderator rods," and the reactor fuel is incorporated therewith in good heat contact to form assemblies, hereinafter referred to as "moderator-fuel rods."

Other objects of the invention will be pointed out in the following description and claim and illustrated in the accompanying drawings which disclose by way of example the principle of the invention and the best mode which has been contemplated of applying that principle.

In the drawings:

FIGURE 2 is a view in vertical section taken along the line 2—2 in FIGURE 1; and FIGURES 3, 4, 5, 6, and 7 are horizontal sectional views showing modifications of the structure shown in FIGURE 2.

Figure 1:
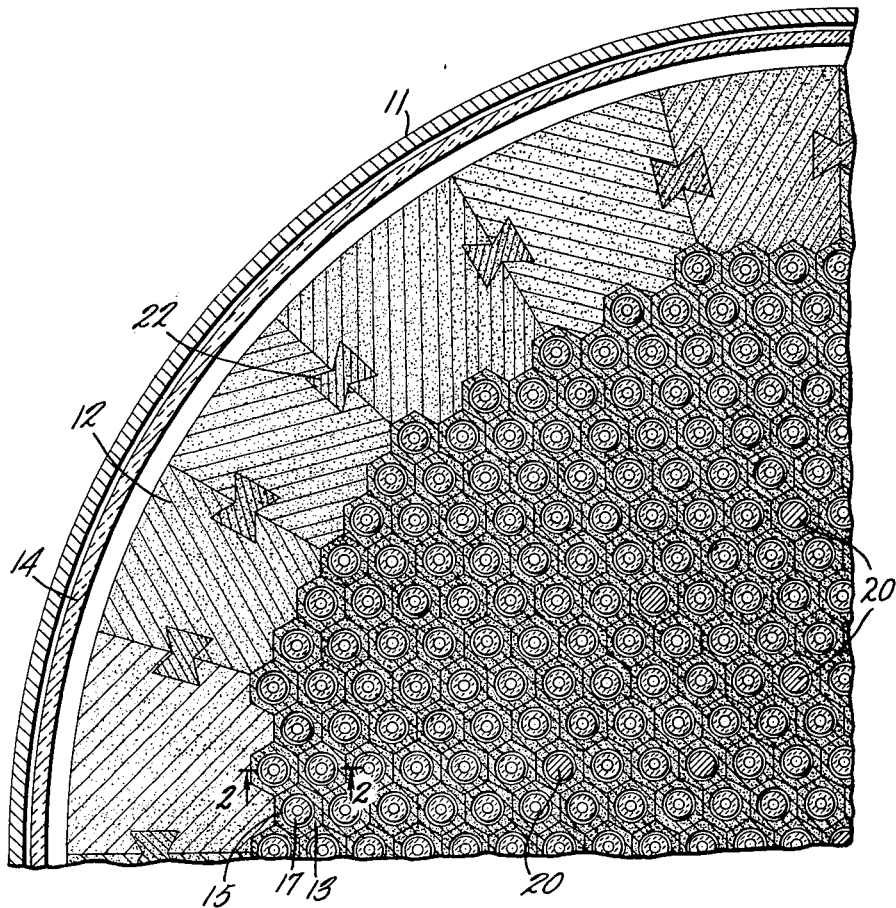
FIGURE 1 is a view in horizontal section of a part of a neutronic reactor constructed according to the invention.

Numerous advantages are realized from a reactor constructed in accordance with the principles of the invention. Since the mass of the moderator-fuel rods is increased by the presence of moderator material therein, the thermal capacity for a given quantity of fuel is increased also. These rods will serve as accumulators of heat whereby, in the event of cooling failure, an excessive rate of temperature rise of the fuel and a correspondingly increased escape of fission products by outward diffusion will be prevented. Particularly in gas-cooled reactors of high specific power, this condition involves great advantages from the point of view of controlling the reactor operation.

From the point of view of thermal stressing, a favorable temperature distribution will be obtained in the moderator block of the reactor which involves an essential advance as compared with a reactor having the cooling effected by means of coolant passages not containing fuel elements.

In the particular embodiments of the invention in which the fuel is surrounded by moderator material, the possibility of fission products diffusing out from the moderator-fuel rods is reduced still further. In comparsion with prior reactors of the kind in which the fuel is in direct contact with the moderator, the invention involves the additional advantage of facilitating refueling, i.e., replacement of fuel elements.

Also, it should be noted that a reactor structure in accordance with the invention provides good neutron economy because the reactor core need not contain metallic supporting structural elements exhibiting high neutron absorption.

Referring now to a representative embodiment of the invention as shown in FIGURES 1, 2 and 3 of the drawings, a pressure-tight cylindrical, metallic container 11 is adapted to enclose a graphite-moderated, gas cooled, heterogeneous neutronic reactor. Separated from the container 11 by thermal shield 14 is the reactor core consisting of a moderator block (to be described in detail presently), moderator-fuel rods 17, a neutron reflector 12 and control rods 20. The neutron reflector 12 is formed of a plurality of irregularly-shaped blocks which completely enclose the moderator block and is formed of a suitable neutron reflecting material which may be of the same material as the moderator, if desired. Dovetail shaped keys 22 serve to keep the reflector and the enclosed reactor core together.

The moderator block is formed of parallel-epipedic columns 13 of pressed graphite to which, if desired, additives and a cement are added. As seen in FIGURE 1, the hexagonal cross-sections of the columns 13 permit them to be positioned close to each other with the least possible space between adjacent columns.

Each of these columns 13, which may be made of separate, stacked column elements 13a and 13b, has a centrally disposed passageway 15 extending throughout the length of the column for receiving a moderator fuel rod 17 made up of a number of rod elements 17a. The ends of each respective passageway 15 are connected to a suitable means (not shown) for supplying and withdrawing a cooling fluid such as, for example, helium.

As best seen in FIGURE 3, each of the moderator-fuel rods 17 is centered within the passage 15 by the provision of guiding ribs or flanges 18 abutting the cylindrical outer surface of the rods 17. Of course, it is understood that the ribs may be elongated, longitudinally or helically, or may be projections of other configurations, if desired. It will be apparent now that an important advantage in this arrangement is obtained by the coolant fluid flowing over the entire outer surface of each moderator-fuel rod.

The moderator-fuel rods 17, as mentioned above, are composed of a plurality of rod elements 17a stacked one on top of the other. Each of the rod elements 17a, in turn, is formed of a tubular moderator rod 19 of pressed graphite enclosing cylindrical pellets 21 of atomic fuel, such as uranium carbide, in such a manner that a good heat-conductive contact is formed between the fuel pellets 21 and the moderator rod 19. After the fuel pellets 21 have been inserted within the moderator rods, the ends are closed by plugs 23, also of graphite. All of the rod elements 17a in the same cooling passage 15 may be either mutually free or mechanically attached to each other and may be removed from the reactor by means of a suitable device (not shown) when changing fuel.

Further, a plurality of control rods 20 of a highly neutron-absorbing material are positioned in a predetermined manner as is well known in the art to regulate and control the reactivity of the reactor.

To prevent fission products from penetrating into the moderator block, there may be provided around the fuel or the moderator-fuel rods a can or a surface layer of a suitable material to form a barrier for the fission products. In the above-described embodiment, the diffusion barrier may consist of ceramic material in a relatively thin layer to enclose the moderator-fuel rods. As an alternative, the barrier may be placed about both the fuel and the moderator rods. Of course, it should be understood that a diffusion barrier is not necessary in the practice of the invention.

In the modification as shown in FIGURE 4, the moderator column 13 has a square cross-section and the cooling passageway 15 has an accurately formed cylindrical surface. To position the moderator-fuel rod 17 in the cooling passageway 15 in such a manner that it is aligned axially and is cooled uniformly from all sides, the rod 17 is supported by projections 25. If the moderator-fuel rod 17 is provided with a can of a material substantially impervious to fission products, the projections are formed integrally with the can.

If desired, each moderator column 13 may be provided with several passageways 15, as illustrated in FIGURE 5 of the drawings. This moderator column 13 in FIGURE 5 has an approximately square cross-section and has four passageways 15 located symmetrically at such a distance from the column sides that the moderator column 13 is cooled uniformly. Of course, other configurations may be formed to provide various numbers of cooling passageways in a single moderator column. For example, six coolant passageways 15 may be arranged conveniently in a column 13 having a hexagonal cross-section. However, it should be understood that increasing the size of any moderator part renders that part bulkier and, consequently, more difficult to replace.

Instead of enclosing the fuel pellets in tubular moderator rods, the fuel may be enclosed in another manner such as the one illustrated in FIGURE 6 of the drawings. In this arrangement, the moderator-fuel rods 17 are formed of a uniform mixture of uranium compound, preferably uranium carbide, and graphite. This mixture is formed, for example by pressing, into solid rods 17, FIGURE 6, which are removable from the column 13. Also, during the pressing operation, guiding ribs are formed on the surface of the rods 17 to position each rod in its respective passageway. For an alternative, the rod may be coated with a material, such as a ceramic material, substantially impenetrable to fission products.

In the embodiment illustrated in FIGURE 7 of the drawing, there is introduced into the coolant passage 15 of the moderator column 13 a moderator-fuel rod 17 formed of a moderator material core 19 surrounded by a tubular fuel sleeve 21. Similarly as in FIGURES 4 and 5, the projections 25 are formed integrally with the sleeve but in this embodiment the sleeve is of the fuel material.

Each moderator-fuel rod in the above-described embodiments may be divided along its length into two or more rod sections or elements. It is possible also to assemble the moderator-fuel rod from a continuous core of moderator material surrounded by a tubular sleeve of fuel material which is divided along its length into sections. Finally, one or more slits may be formed in the surfaces of the tubular element of fuel material to improve its resistance to stresses created due to the difference between the coefficients of thermal expansion of the two materials.

In the above-described neutronic reactor embodiments, the fuel may consist of uranium carbide, UC, in the shape of pressed and sintered cylindrical pellets having a length of 20 mm. and a diameter of 15 mm. with a density of 12 g./cm.$^3$. The moderator rods, adapted to receive the fuel pellets, are formed of graphite having a density of 1.7 g./cm.$^3$ and an outer diameter of 40 mm. Although the fit of the fuel pellets within the moderator rods should be relatively good, a small amount of play may be tolerated. The moderator rods serve, among other things, as lateral supporting structure for the fuel pellets but, nevertheless, a small amount of mechanical deformation or decomposition due to neutron radiation or thermal stresses can be permitted.

The moderator block of one particular reactor is formed of approximately 750 parallelepipedic columns of graphite having a density of 1.7 g./cm.$_3$ and a hexagonal cross-section, the sides each being 48 mm. in width. Each column is provided with a central, approximately circular passageway having a 47 mm. diameter. Moderator-fuel rods are introduced into the majority of these passages, a few passages being reserved for control or safety rods 20. By means of a suitable device (not shown) moderator-fuel rods can be removed and new ones inserted while the reactor is in operation.

The portion of the total moderator quantity incorporated with the moderator-fuel rods and therefore being exchangeable may be 10 to 40 percent but preferably is 20 to 30 percent. For the smaller quantity, 10 percent, a low heat capacity of the moderator-fuel rods results in the fuel being easily overheated should the cooling be shut off either partially or entirely. This smaller percentage, therefore, may result in the safety of the reactor being jeopardized. To combine more than 40 percent of the total moderator quantity with the moderator-fuel rods is not desirable since the moderator block must be sufficiently rigid to support the fuel section.

The spaces between the walls of the passageways of the moderator columns and the moderator-fuel rods form cooling passages through which the coolant flows. As a preferred example, a suitable coolant material would be helium under a pressure of 15 atmospheres gauge. The size of the moderator core includes a 35 cm. thick reflector which is of a diameter of 3.1 m. and a height of 2.9 m.

With the above-described specific dimensions and with an operating power of 15 kw. per kg. reactor fuel, the initial temperature rise is approximately 9° C. per second if the cooling is abruptly interrupted. In contrast, for a conventional reactor structure having the entire moderator quantity placed in the moderator block, the temperature rise of the fuel under the above conditions would be approximately 70° C. per second.

Within the scope of the invention the above-described embodiments may be modified as to their details. For instance, the moderator may consist of beryllium or a chemical compound thereof, possibly mixed with graphite. Furthermore, parts of the moderator may consist of different materials, the moderator rods, for instance, consisting of graphite and the moderator block of beryllium oxide. The moderator-fuel rods may be formed of more than two concentrically arranged layers in which alternate layers consist of fuel and the intervening layers consist of moderator material.

We claim:

A neutronic reactor comprising fissionable fuel rods and a graphite moderator from about 20 to 30% of said moderator being divided into substantially equal portions and surrounding said fuel rods in direct contact therewith, to form a plurality of fuel moderator rods, the remainder of said graphite moderator forming a plurality of columns, each column having a passageway extending axially therethrough, each moderator-fuel rod being positioned in spaced relation within one of said passageways, thereby forming annular passages in said columns for circulating a cooling fluid to remove heat, the total of said moderator material being preselected to sustain a chain reaction.

References Cited in the file of this patent

UNITED STATES PATENTS

| | | |
|---|---|---|
| 2,708,656 | Fermi et al. | May 17, 1955 |
| 2,831,807 | McGarry | Apr. 22, 1958 |
| 2,863,815 | Moore et al. | Dec. 9, 1958 |
| 2,872,401 | Wigner et al. | Feb. 3, 1959 |
| 2,907,705 | Blainey | Oct. 6, 1959 |
| 2,940,915 | Hammond et al. | June 14, 1960 |
| 2,990,352 | Finniston et al. | June 27, 1961 |
| 2,996,444 | Simnad | Aug. 15, 1961 |
| 3,030,292 | Ritz | Apr. 17, 1962 |

FOREIGN PATENTS

| | | |
|---|---|---|
| 559,489 | Belgium | Aug. 14, 1957 |
| 562,864 | Belgium | Dec. 14, 1957 |
| 792,170 | Great Britain | Mar. 19, 1958 |

OTHER REFERENCES

Nucleonics, vol. 14, No. 3, March 1956, pp. 34–44.

Atomic Energy Publication HW–52000, Annual Report Plutonium Recycle Program Fiscal Year 1957, Sept. 20, 1957, pp. 46–48.